United States Patent [19]
Breen

[11] Patent Number: 4,856,893
[45] Date of Patent: Aug. 15, 1989

[54] LASER DISTANCE MEASURING METHOD AND APPARATUS

[75] Inventor: Michael T. Breen, Garden City, Mich.

[73] Assignee: Eaton Corporation, Cleveland, Ohio

[21] Appl. No.: 103,092

[22] Filed: Sep. 30, 1987

[51] Int. Cl.$^4$ ............................ G01C 3/08; G01P 3/36
[52] U.S. Cl. ........................................ 356/5; 356/28.5; 342/111
[58] Field of Search .................... 356/5, 28.5; 342/108, 342/109, 111, 127, 134; 367/90, 100, 102

[56] References Cited

U.S. PATENT DOCUMENTS

| | | | |
|---|---|---|---|
| 3,365,717 | 1/1968 | Holscher | 356/5 |
| 3,402,630 | 9/1968 | Blau et al. | 356/5 |
| 3,647,298 | 3/1972 | Soules | 356/5 |
| 4,184,154 | 1/1980 | Albanese et al. | 342/111 |
| 4,190,361 | 2/1980 | Dubrunfaut | 356/5 |
| 4,298,280 | 11/1981 | Harney | 356/5 |
| 4,403,857 | 9/1983 | Holscher | 356/5 |
| 4,537,502 | 8/1985 | Miller et al. | 356/5 |
| 4,690,551 | 9/1987 | Edwards et al. | 356/5 |

Primary Examiner—Thomas H. Tarcza
Assistant Examiner—Linda J. Wallace
Attorney, Agent, or Firm—C. H. Grace

[57] ABSTRACT

A laser distance measuring apparatus in which source beams from two lasers are combined and focused on a target. One beam is continuous wave and one has periodic narrow pulse envelopes. After reflection the composite reflected beam is redivided in a diffraction grating and compared with two respective reference beams by means of two photodetectors. Doppler data are provided, as well as separate high resolution and low resolution range output data. Integration of the Doppler data in a computer, and combination of the three data signals there, enable an unusually complete and accurate record of the shape of the target even if the shape has many severe discontinuities, as in the case of a turbine rotor. An alternative embodiment provides for switching the pulse time of flight portion of the system to utilize various harmonics of the pulse envelope waveform. Known phase delays are switchably interposed in one channel so that relative phase readings between the reference and target pulses are performed at near-zero phase differences. Phase readings can be made accurately when the signals possess near-zero phase differences. Fixed errors can be measured and calibrated out of measurement data.

7 Claims, 2 Drawing Sheets

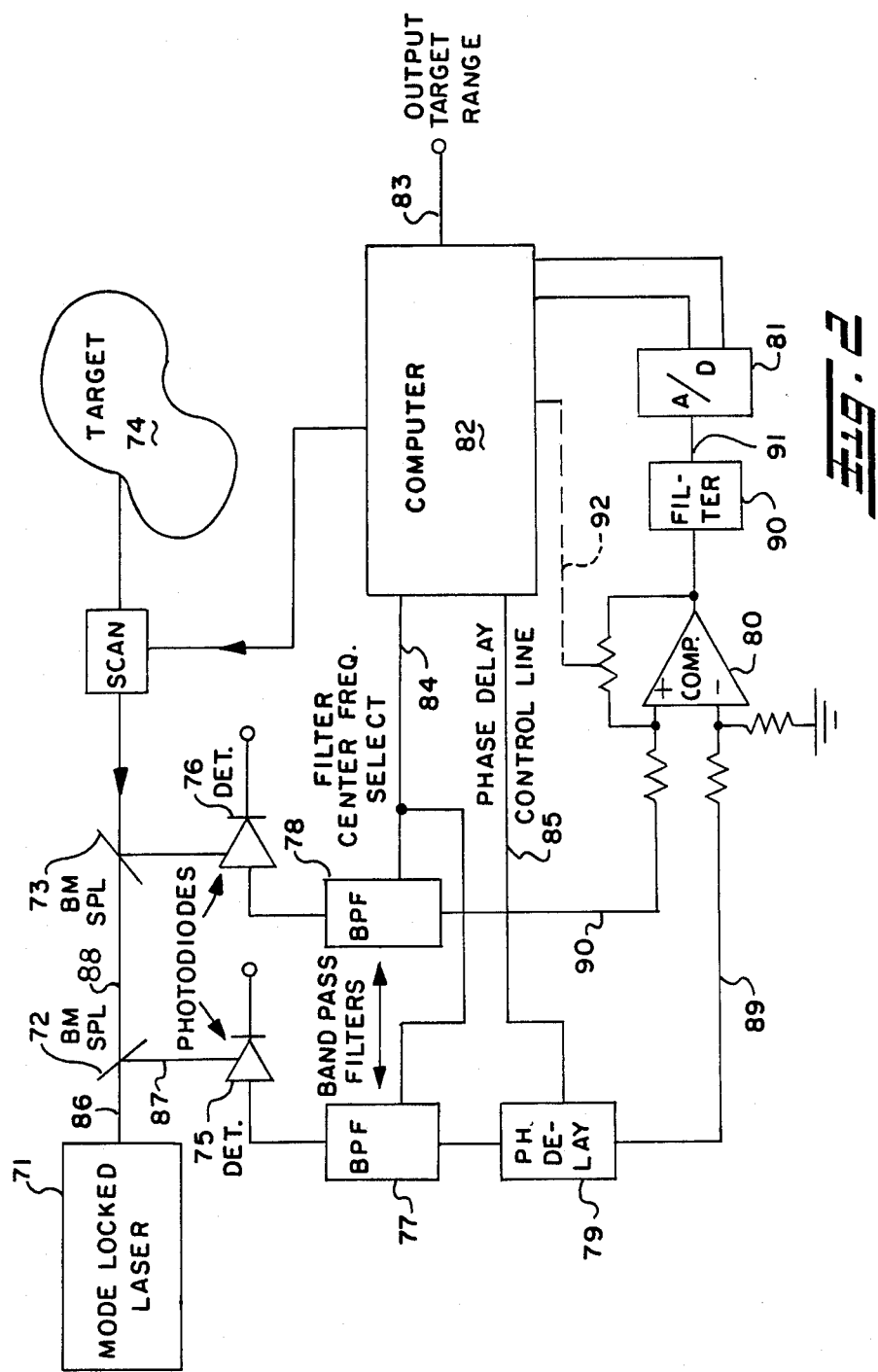

LASER DISTANCE MEASURING METHOD AND APPARATUS

CROSS-REFERENCES TO RELATED APPLICATIONS

This application is one of a group of related applications that were filed simultaneously on Sept. 30, 1987, including Ser. No. 103,085, Ser. No. 103,086, Ser. No. 103,087, and Ser. No. 103,088.

1. FIELD

The invention relates to methods and apparatus employing lasers to measure surface shape and/or velocity of an object without mechanically contacting the object.

2. PRIOR ART

Prior gauging systems have employed lasers for measuring surface shapes of objects by Doppler principles, or by time of flight principles, or both, but not by the particular two simultaneous measurement techniques and result-combining techniques that are used herein. "Tone ranging" methods employing a plurality of frequencies, usually harmonically related, have been used previously in radar systems.

SUMMARY

Absolute distance measurements (obtained from time of flight data or chirp data) are combined with accurate relative Doppler measurement data to yield distance information that is both accurate and absolute.

Beams from a continuous wave laser and a pulsed laser are combined and reflected from a target whose shape is to be measured. Signals from the two lasers are, after reflection from the target, spatially divided by diffraction, and detected. The continuous wave signals provide a Doppler shift frequency output, which is integrated by a computer.

The pulse laser signals, after reflection from the target, are processed as separate harmonics. A fundamental and a selected higher harmonic of the pulse envelope are utilized to provide low resolution range output data and high resolution range output data, respectively. These two outputs and the Doppler data are combined by the computer. The system is basically an open loop type.

In an alternative embodiment calibrated phase delays are interposed in one channel by computer-controlled switches, so that relative phase readings between the reference and target pulses are performed so as to minimize fixed errors in the system. It also provides for switching the pulse time of flight portion of the system to utilize various harmonics of the pulse envelope waveform.

An object of the invention is to provide a distance gauge having a "tone ranging" system utilizing a plurality of harmonics of a pulse laser signal to produce unambiguous low resolution and accurate high resolution output data. The tone ranging system is described as the preferred embodiment.

Another object is to provide a gauge in which range measurement error can be reduced to a desired level limited primarily only by laser oscillator phase noise, and in which fixed phase errors can be calibrated out of the system.

Another object is, where phase measurements between a reference signal and a target signal are to be made, to introduce known additional phase shift locally to one of those signals, in order to adjust their phase difference so as to obtain maximum measurement accuracy.

Another object is to provide a gauge whose accuracy is improved by integrating a plurality of analog measurements before the data are digitized.

Other objects are to provide a gauge in which accuracy is improved by tailoring its measurements to particular targets, by combining the results in accordance with target tolerance requirements, and by using apparatus components in common.

BRIEF DESCRIPTION OF DRAWINGS

FIG. 2 is a diagram of a local phase changing system for obtaining data of progressively greater accuracy from progressively higher harmonics of the laser's envelope pulse repetition frequency. This is an alternative to a portion of the embodiment of FIG. 1.

DETAILED DESCRIPTION

Figure 1:
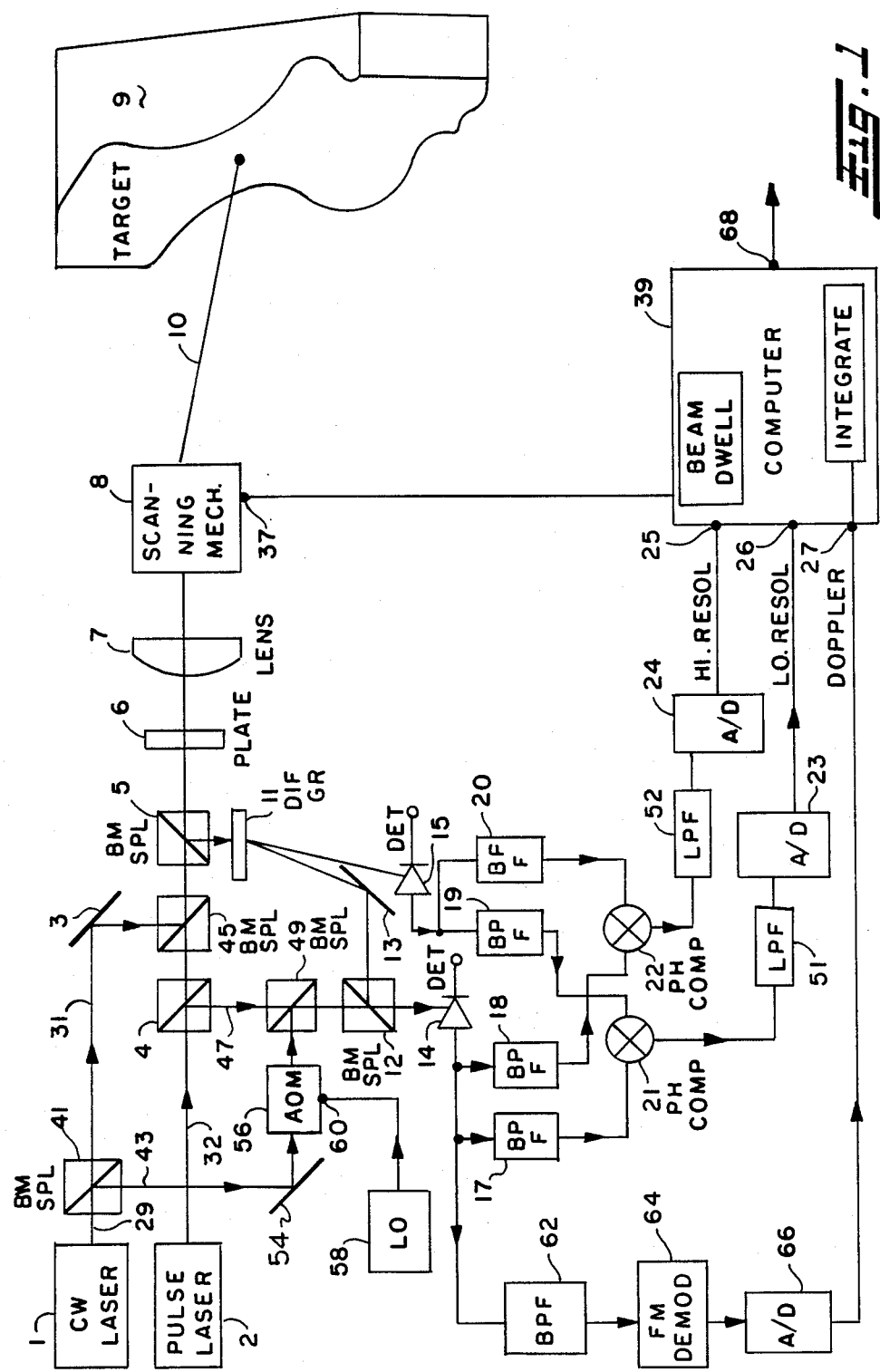
FIG. 1 is an optical and electronic schematic block diagram of a preferred embodiment of the apparatus.

In the embodiment of FIG. 1 a continuous wave (CW) helium-neon laser 1 emits a single frequency polarized beam 29, which is incident upon a beam splitter 41. At the beam splitter one portion 43 of the beam 29 is redirected to serve as a Doppler reference beam; another portion 31 passes directly through the beam splitter 41 to serve as a Doppler target beam. Beam 31 is reflected at a mirror 3 and reflected again at a beam splitter 45, to travel toward a beam splitter 5.

A second laser 2 is a pulse, mode-locked, Argon+ type, emitting a train or beam 32 of bursts of light. The duration of the envelope of each burst is approximately 0.150 picoseconds, FWHM and the envelope pulse repetition rate is 82 MHz. As shown in FIG. 1, the radiation output 32 is incident upon a beam splitter 4, which divides it into a reference beam 47 and a target beam. The target beam passes directly through both the splitter 4 and the beam splitter 45 to travel to the beam splitter 5.

The portions of the two laser beams that are intended to serve as reference beams are described below. The portions of the two laser beams that are intended to serve as target beams travel directly through the polarized beam splitter 5 and to a quarter-wave plate 6. The plate 6 circularly polarizes the light.

Thereafter the composite target beam is focused by a converging lens 7 toward the approximate distance of a target 9, and passed through a scanning mechanism 8. The scanner redirects the beam along a line 10 to the target 9, whose surface profile is to be measured. The scanner 8 has two degrees of freedom, and is controlled by electrical signals received at terminals 37 from a computer 39.

At the target 9 the composite target beam is reflected or back-scattered from a spot. At least some of the energy returns along the same beam path 10 and back through the scanner 8 to the lens 7, where it is collimated, then to the quarter-wave plate 6. Upon passing through plate 6 the light is restored to linear polarization and shifted 90°. It goes to the beam splitter 5, where it is redirected by reflection to a dual frequency diffraction grating 11.

In the grating 11 two wavelengths that are present (one from each laser) are spatially, i.e., angularly, separated by diffraction. One wavelength, namely that from CW laser 1, is reflected from a mirror 13, and strikes a beam splitter 12, from which it is reflected onto a photodiode detector 14. Detector 14 performs functions for both the Doppler and the pulse range measurements, as will be seen.

The other wavelength from grating 11, namely that of pulse laser 2, is incident upon a second photodiode detector 15, where it is converted to an electrical signal corresponding to the envelope of the incident light waveform. This is a target return pulse signal. The electrical signal from 15 is connected directly to both a bandpass filter 19 and a bandpass filter 20, which are parts of a tone ranging system.

Filter 19 has a center frequency of 82 MHz and a bandwidth of 16 MHz. It transmits the first harmonic of the pulse train envelope and greatly attenuates all other harmonics. Filter 20 has a center frequency of a selected harmonic of 82 MHz. For example, in the embodiment being described, the third harmonic is used, having a center frequency of 246 MHz. The bandwidth of filter 20 is narrow enough to attenuate greatly all other harmonics of the envelope train.

From the output of filter 19 connection is made to a phase comparator 21. It is a double balanced passive mixer of diodes and center-tapped rf transformers made for commercial sale by Mini-Circuits Laboratories. In a similar manner, the output of filter 20 is connected to a similar phase comparator 22. Phase comparator 21 operates at the first harmonic frequency of the envelope and phase comparator 22 operates at the third harmonic frequency.

The portions of the two laser beams that serve as target beams have just been described. The portion of the pulse laser beam that serves as a pulse reference beam, and the combining of the pulse target beam with the pulse reference beam, will now be described.

The pulse reference beam 47 passes directly through a beam splitter 49 and a beam splitter 12, to impinge upon the photodiode detector 14. The beam is envelope detected, to produce a pulse envelope waveform representing laser 2. The envelope signal is applied to two bandpass filters 17 and 18, whose frequencies are 82 MHz and 246 MHz respectively. They are identical to filters 19 and 20. Signals from filters 17 and 18 are conducted to inputs of mixers 21 and 22, respectively, where they are compared as to phase with target return signals from filters 19 and 20, respectively.

Outputs of the phase comparators 21 and 22, representing the first and third harmonic phase delays, are filtered in lowpass filters 51 and 52, respectively. The filters' cutoff frequency is 100 Hz. Conversion from analog to digital information is accomplished in analog to digital (A/D) converters 23 and 24, respectively, and a low resolution output and high resolution output are presented at terminals 26 and 25 respectively of the computer 39. These are the range outputs, whose data values depend upon the travel time of laser pulses to the target 9 and back.

The reference Doppler beam will now be described, along with circuits for comparing it with the target Doppler beam. From the beam splitter 41, the reference Doppler beam 43 goes to a mirror 54, which reflects it to an acoustooptical modulator 56. To offset the reference beam's frequency, it is modulated in the Bragg cell modulator 56 by a 5 MHz signal from a local oscillator 58, which is applied to a modulation terminal 60. The purpose of the frequency offset is to facilitate determination of the sign of the Doppler shift.

The offset reference beam is reflected in a beam splitter 49, after which it passes directly through the beam splitter 12. The reference Doppler and target Doppler beams combine at the output of splitter 12, and strike the photodiode detector 14. Their beat frequency envelope represents the Doppler shift, offset by 5 MHz. From detector 14 a detected signal is connected to a bandpass filter 62 for rejection of the pulse signals. Filter 62 has a passband from 3 MHz to 7 MHz.

The output of filter 62 is connected to an fm demodulator 64, whose output is connected to an A/D converter 66. The A/D 66 converts the analog data to a digital signal, which is applied to an input terminal or bus 27 of the computer 39.

In the computer 39 the Doppler shift portion of the signal at 27 is extracted by subtracting a fixed value corresponding to 5 MHz. If desired the frequency of the nominally 5 MHz local oscillator can be monitored by the computer 39. The resulting Doppler shift is integrated in the computer and combined with the low resolution and high resolution range data to provide digital output information at a terminal 68. Software for accomplishing this is not described because it is within the routine skills of many software design engineers.

In the simplest method of combining the data, the low resolution range signal 26 provides the most-significant-digits data, with least problem of ambiguity. The high resolution range signal 25 provides less-significant-digits data, and the Doppler signal at 27, after integration, provides the least-significant-digits data, which is the data of highest resolving power.

Two other methods of combining the data have been devised, which are more complex but yield better results, namely, (a) the method of preferred ranges, and (b) the multiple averaging method. The preferred embodiment of this invention utilizes method (a), and an alternate embodiment utilizes method (b).

The method of preferred ranges is based on the fact that, in a system of this type, there are some target distances that inherently can be more accurately measured than others. The system waits until the radial distance is near one of those preferred distances, then makes a range measurement. Thereafter, data from nearby previous and subsequent range measurements are adjusted accordingly, to improve their accuracy.

The measurement system is capable of measuring more accurately in its Doppler mode than in its high resolution pulse mode, and least accurately in its low resolution pulse mode. The higher accuracy modes would entail increased risk of ambiguity if operated alone.

Typically when a product which is to be inspected (target) is manufactured, some portions of its contours have tighter dimensional tolerances than others. For example, in machining an internal combustion engine block, the exact location of a cylinder hole is less critical than the surface contour of the hole. The radial shape of a cam is more critical than its longitudinal location on a camshaft.

By simultaneously taking into account both the nonuniform accuracy capability of the measurement system and the nonuniform tolerances of the product being measured, the measurement program can be tailored to the product. The measurement system can be arranged to provide its greatest accuracy where the product's tolerances are most stringent.

The laser distance measuring apparatus of method (a) comprises scanning means for controllably directing the composite target beam to illuminate a point on the target, said scanning means comprising dwell means for holding said composite target beam at an area of the target to obtain a greater density of distance measurements, especially where information of higher accuracy is desired; and computer means for processing data of distance measurements to utilize the redundancy of the greater density of data to increase the accuracy where said higher accuracy is desired. The scanning means referred to consists of the scanning mechanism 8 and a portion of the computer 39. The composite target beam is the beam 10 of FIG. 1. The dwell means is a portion of the computer program that stops the scanning of the scanning mechanism during a time delay or "dwell interval" at a direction where high measurement accuracy is to be obtained.

By the second method (b) above, semicoherent averaging can be done whereby the accuracy increases roughly as the square root of the number of measurement samples being averaged. The redundancy improves the results. Because of the high (82 MHz) repetition rate of the time of flight measurements, many samples are obtained in a short time. Moreover, the Doppler information creates a bridge across the time-of-flight measurements, and can be employed to adjust the output data to an optimum accuracy, subject to limitations of noise and irreducible systematic errors.

One hardware embodiment of the method (b) above involves averaging a plurality, for example 5, readings of each information channel before the signals are converted from analog to digital form. In FIG. 1, the low-pass filters 51 and 52 have cutoff frequencies selected to average the analog data that pass through them, and the FM demodulator 64 has an output bandwidth small enough to perform an averaging function. In this particular embodiment the number of readings in each sample is not a fixed number, of course, as the averaging tails off continuously in accordance with the transfer function of the filter involved.

FIG. 2 depicts an alternative embodiment of a portion of the system of FIG. 1. It shows a refinement of the concept of measurements employing a plurality of harmonic frequencies of the laser's pulse repetition frequency. It also shows a feature of the invention that improves phase comparisons between the reference signal and the return target signal; a phase delay of known amount is switchably inserted in one signal channel so that the signals are nearly in phase, where their phase difference can be measured more precisely.

Optical output from a laser 71 is split at the beam splitter 72. One component, beam 87, travels to a high speed photodiode 75, where it is detected and converted to an electrical signal. This signal is conducted to a bandpass filter at 77 and adjusted as to phase by passing it through a phase delay device 79. The delay 79 is adjustable in steps of known delay. Its output signal at 89 is then input to a high gain comparator 80.

A second output from the beam splitter 72, namely the optical beam 88, travels through a beam splitter 73. It then goes to the target 74 whose range is to be measured, from which it reflects and returns to the splitter 73. The return beam reflects from the splitter 73 to a second high speed photodiode 76. Detection occurs at diode 76, and its electrical output signal is filtered by a bandpass filter 78, then connected as shown at 90 to another input of the comparator 80.

The signals at the two inputs 89 and 90 are subtracted in comparator 80, and the difference signal is smoothed in a filter 91. Its output at 91 is digitized by an analog-to-digital converter (A/D) 81, whose output is connected to a computer 82. Final digital output data from the computer appears at terminals 83.

During operation of the system the computer 82 carries out a multistep procedure, preferably under the control of software. First it selects the center frequency of filters 77 and 78 to be a harmonic, for example the first harmonic, of the laser's pulse repetition frequency. It transmits control signals on lines 84 to the filters 77 and 78, to set the center frequency of their passbands to the selected frequency. In practice, the control signals at 84 switch some reactive components (inductors and capacitors) out of use and others of different values into use.

The computer 82 then transmits control signals on lines 85 to the phase delay unit 79. Design details of the switching of phase delay 79 are known in the prior art. One form of the apparatus utilizes a plurality of coaxial transmission line segments that are switched under the control of the command signals 85. Remotely controlled switches connect each of them into and out of the circuit. The delay interposed by each delay line and each combination of delay lines is known by prior calibration. In one practical embodiment, the line segments of various lengths are connected in parallel with shorted circuiting switches, and the switches are controllably opened and closed by the command signals 85.

The phase delay that is imposed upon the reference signal by delay unit 79 is controlled by the computer 82 so as to minimize the magnitude of the filtered output 91 of comparator 80. The computer accomplishes this by a software-controlled iterative process of changing the phase delay and comparing the magnitude of the resulting signal at 91 with its pre-change magnitude. If it decreased as a result of the change, a further incremental change in the same sense is made in the amount of delay. This procedure is continued until the signal at 91 starts to increase.

When an approximate minimum is achieved, the computer 82 responds to its software to store the value of phase delay of unit 79 that produced the minimum. That value of phase delay is the delay required to bring the signal 89 to a near zero phase difference with the signal 90, and is therefore a measure, known to the computer, of the difference in phase between the reference signal from filter 77 and the target signal from filter 78. Of course the phase delay unit 79 can be connected in either the reference channel or the target return channel, (or both).

Thereafter, the computer selects a higher harmonic of the pulse repetition frequency and proceeds again in the manner described above to null out (approximately) the phase difference of the output 91 of comparator 80. Each time this operation is performed for a higher harmonic, the distance from gauge to target (which is proportional to phase difference by a proportionality constant that depends upon the harmonic number), is determined with greater precision. If desired, the gain of the comparator 80 can by adjusted by the computer, as symbolized by control line 92, to allow further refinement of the range accuracy in conjunction with the minimum phase change increment.

To reduce fixed errors a known target is placed at known distances from the gauge; phase and voltage offsets are recorded in the computer 82 and calibrated out of the measurements.

What is claimed is:

1. Laser distance measuring apparatus for measuring distances to points on a target object, comprising:
   a source of a pulse laser beam;
   a source of a CW laser beam;
   splitting means for providing a reference beam and a target beam from said pulse laser beam;
   splitting means for providing a reference beam and a target beam from said CW laser beam;
   means for combining said pulse target beam and said CW target beam to provide a composite target beam for measuring distances to points where the target beam impinges upon the target object;
   scanning means for controllably directing said composite target beam to illuminate a point on the target, said scanning means comprising dwell means for holding said composite target beam at an area of the target to obtain a greater density of distance measurements, especially where information of higher accuracy is desired;
   computer means for processing data of distance measurements to utilize the redundancy of the greater density of data to increase the accuracy where said higher accuracy is desired;
   means receiving the composite beam after reflection from the target, for separating the reflected pulse target beam component from the reflected CW target beam component;
   frequency discriminator means for measuring Doppler frequency shift of the CW target beam relative to said CW reference beam and providing Doppler shift data;
   integration means for integrating said Doppler shift data to provide relative distance data;
   phase comparison means measuring the phase difference between said reflected pulse target beam component and said pulse target reference beam, for acquiring target distance data based upon the time of flight of a pulse;
   computer means combining said pulse data and said Doppler data for providing output data, said output data comprising distance measurements corresponding to points on the target object at which said controllably directed composite beam impinges upon said target object.

2. Apparatus as in claim 1 and wherein:
   said phase comparison means comprises means for measuring said phase difference between the first harmonic frequency of said target and reference beams; and,
   said phase comparison means further comprises phase comparison means measuring the phase difference between a higher harmonic frequency component of said reflected pulse target beam component and said pulse target reference beam, for acquiring distance data based upon said higher harmonic measurement; and,
   said computer means for providing output data includes means for processing said higher harmonic distance data into its output data.

3. Laser distance measuring apparatus for measuring distance to points on a target object comprising:
   pulse laser means for providing laser pulses for time of flight measurements;
   a time of flight system for time measurement by phase comparison of a first harmonic frequency of the modulation envelope of a target beam and a reference;
   a time of flight measuring system for time measurement by phase comparison of a higher harmonic frequency of the modulation envelope of a target beam and a reference;
   CW laser means for providing a laser beam to movably illuminate a spot on the target object for Doppler measurements;
   a Doppler measuring system for measuring rate of change of radial distance from the gauge to the illuminated spot of the target and
   for integrating the Doppler data to provide distance data;
   computer means for providing processed distance data including:
      means for combining the measurements of at least two of the following elements: said time of flight system of a first harmonic frequency, said time of flight system of a higher harmonic frequency, and said Doppler measuring system;
      means for averaging a plurality of measurements made at the same point on the target; means for smoothing measurements made at neighboring different points on a smoothly contoured target, to reduce the effects of noise and errors on the data; and
   data output means for outputting said processed distance data, said processed distance data comprising distance measurements corresponding to points on said target object at which said CW laser beam impinges upon the target object.

4. Laser distance measuring apparatus for measuring distances to points on a target object, comprising:
   a source of a pulse laser beam;
   splitting means for providing a reference beam and a target beam from said pulse laser beam;
   means receiving the reference beam for detecting its pulse envelope and producing a corresponding reference electrical signal;
   means receiving the target beam after reflection from the target for detecting its pulse envelope and providing a corresponding target electrical signal;
   means for producing a known and adjustable amount of phase delay of at least one of said reference electrical signal and said target electrical signal;
   phase comparison means for measuring the phase difference between said electrical signals after said delay and providing a first phase difference indication;
   means responsive to said first phase difference indication for adjusting said phase delay to make said phase difference approximately a quadrature relationship;
   computing means for computing data indicating the phase relationship between said reference and target signals by algebraically adding said known amount of phase delay to said first phase difference indication; and
   time-of-flight data processing means utilizing said data indicating said phase relationship between said reference and target signals, for providing output data comprising distance measurements corresponding to points on said target object at which said target beam impinges upon the target object.

5. Laser distance measuring apparatus for measuring distances to points on a target object, comprising:
   a source of a pulse laser beam whose pulse envelope comprises a plurality of harmonic frequency components;

splitting means for providing a reference beam and a target beam from said pulse laser beam;

means receiving the reference beam for detecting its pulse envelope and producing a corresponding reference electrical signal;

means receiving the target beam after reflection from the target for detecting its pulse envelope and providing a corresponding target electrical signal;

first switchable bandpass filter means for selecting one harmonic from among the plurality of harmonics of said reference electrical signal;

second switchable bandpass filter means for selecting one harmonic from among the plurality of harmonics of said target electrical signal, said harmonic being the same number harmonic as that of said first filter means;

phase comparison means for measuring the phase difference between the bandpass filtered electrical signals and providing a phase difference indication indicative of the distance to said target;

means for switching said first bandpass filter means to select a different harmonic, different from said one harmonic; and for switching said second bandpass filter means to also select said different harmonic; and time-of-flight data processing means utilizing data of said phase difference indication indicative of the distance to said target, for providing output data comprising distance measurements corresponding to points on said target object at which said target beam impinges upon the target object.

6. A method for measuring distances from a gauge to points on a target object comprising the steps of:

providing a pulse laser beam;

splitting said pulse laser beam into a reference beam and a target beam;

providing a CW laser beam;

splitting said CW laser beam into a reference beam and a target beam;

combining said pulse target beam and said CW target beam to provide a composite target beam for measuring distances to points where the target beam impinges upon the target object;

controllably directing said composite target beam by scanning to illuminate a point on the target, including holding said composite target beam at an area of the target to obtain a greater density of distance measurements there, especially where information of higher accuracy is desired;

processing data of distance measurements to utilize the redundancy of the greater density of data to increase the accuracy where said higher accuracy is desired;

after reflection of the composite beam from the target, separating the reflected pulse target beam component from the reflected CW target beam component;

measuring Doppler frequency shift of the the CW target beam relative to said CW reference beam and providing Doppler shift data;

integrating said Doppler shift data to provide relative distance data;

measuring the phase difference between said reflected pulse target beam component and said pulse target reference beam, to acquire target distance data based upon the time of flight of a pulse;

combining said pulse data and said Doppler data to provide output data comprising distance measurements corresponding to points on the target object at which said controllably directed composite beam impinges upon said target object.

7. A method as in claim 6 and wherein:

said step of measuring said phase difference comprises measuring the phase difference between the first harmonic frequency of said target and reference beams; and said step of measuring said phase difference further comprises measuring the phase difference between a higher harmonic frequency component of said reflected pulse target beam component and said pulse target reference beam, for acquiring distance data based upon said higher harmonic measurement; and, said step of combining said pulse data and said Doppler data includes utilizing said higher harmonic distance data.

* * * * *